United States Patent [19]

Birbara et al.

[11] Patent Number: 5,021,070
[45] Date of Patent: Jun. 4, 1991

[54] METHOD AND APPARATUS FOR THE SAFE SEPARATION OF COMBUSTIBLE AND/OR EXPLOSIVE GASEOUS MIXTURES FROM AQUEOUS SOLUTIONS

[75] Inventors: Philip J. Birbara, Windsor Locks; Joseph E. Genovese, East Granby, both of Conn.

[73] Assignee: United Technologies Corporation, Hartford, Conn.

[21] Appl. No.: 564,253

[22] Filed: Aug. 7, 1990

[51] Int. Cl.⁵ .............................................. B01D 19/00
[52] U.S. Cl. .................................. 55/46; 55/55; 55/210; 55/184; 55/261; 55/459.1; 220/85 VR
[58] Field of Search ............... 55/1, 97, 46, 55, 210, 55/261, 184, 337, 342, 459.1; 220/85 VR

[56] References Cited

U.S. PATENT DOCUMENTS

| 13,743 | 11/1855 | Bakewell | 55/261 |
| 928,546 | 7/1909 | Schneible | 55/184 |
| 4,432,775 | 2/1984 | Won | 55/41 |
| 4,927,433 | 5/1990 | Wieland et al. | 55/53 |

Primary Examiner—Bernard Nozick
Attorney, Agent, or Firm—Mary R. Bonzagni

[57] ABSTRACT

A method and apparatus are disclosed for separating potentially combustible and/or explosive gaseous mixtures from aqueous solutions. The method employs the concept of utilizing a liquid phase carryover as a combustible gaseous diluent and subsequently, upon separation of the gaseous and liquid phase components, incorporates the addition of a diluent gas to minimize the combustive/explosive potential of the separated gaseous phase component. In a preferred embodiment, the separating apparatus comprises a primary separator, a screen atomizer, a pressure-and-flow control system and a secondary separator.

9 Claims, 2 Drawing Sheets

METHOD AND APPARATUS FOR THE SAFE SEPARATION OF COMBUSTIBLE AND/OR EXPLOSIVE GASEOUS MIXTURES FROM AQUEOUS SOLUTIONS

BACKGROUND OF THE INVENTION

The present invention relates to a gas-and-liquid phase separating system. More particularly, it deals with a multi-stage system that safely separates potentially combustible and/or explosive gaseous mixtures from aqueous solutions.

The present invention may be utilized where two or more gases, that could combustibly or explosively react and which are soluble in an aqueous medium, are generated. For example, the presence of more than 4% $O_2$ concentrations in $H_2$ or more than 6% $H_2$ concentrations in $O_2$ result in gaseous mixtures with high combustive and/or explosive potentials.

Gas-and-liquid phase separators, which employ a plurality of stages for separating various mixtures, are well known in the art. Yet, none to date have addressed the problem of separating potentially combustible and/or explosive gaseous mixtures from aqueous solutions.

Rotary gas/water phase separators have been used in the past for removing a small amount of liquid from a gas stream. The rotary-type separator requires externally supplied energy to spin a drum and a pitot tube pickup to remove the effluent water. However, the high liquid volume that is present in many applications presents an efficiency constraint to the rotary-type separator. In addition, the mechanical wear, physical size and sound level of this device makes it less than completely desirable even for moderate to small liquid-volume applications.

Centrifugal separators are well known in the art and are effective when large volumes of solution are introduced, traveling at relatively high velocities. They have been employed as primary separators and in combination with other separation technologies. But, they too do not address the problem of separating potentially combustible and/or explosive gaseous mixtures from aqueous solutions.

The present invention teaches that the use of an effective amount of an ionized and conductive aqueous solution as a gaseous diluent or liquid phase carryover in a multi-stage separating system substantially eliminates the potential for electrostatic ignition of combustible and/or explosive gaseous mixtures. The conductive properties of aqueous solutions, i.e. seawater, will prevent the buildup of electrostatic charges thereby eliminating a major cause of combustive and/or explosive conditions.

Accordingly, it is the primary object of the present invention to provide a method for the safe separation of potentially combustible and/or explosive gaseous mixtures from aqueous solutions.

It is another object to use the concept of a liquid phase carryover to insure that a safe mixture is maintained by taking advantage of the quenching properties of the liquid phase to reduce the propagation of a combustive and/or explosive reaction.

It is still another object to provide pressure reduction of the gas/liquid mixture followed by gas/liquid phase separation in the presence of a diluent gas flow, which serves to dilute the concentration of the gaseous components to below their respective combustive/explosive concentration limits.

It is a further object to provide a unique separating apparatus which carries out the aforementioned method.

The above and other objects and advantages of the invention will become more readily apparent when the following descriptions are read in conjunction with the accompanying drawings.

SUMMARY OF THE INVENTION

The present invention provides for a method and an apparatus for the safe separation of combustible and/or explosive gaseous mixtures from aqueous solutions.

In a preferred embodiment, the invention comprises a multi-stage separating apparatus having a primary separator; a screen atomizer connected to the separator; a pressure-and-flow control system, in fluid connection with the atomizer; and a secondary separator downstream.

The primary separator, which forms a principal component of the inventive separating apparatus, is designed to insure that separated gases will be mixed with effective quantities of liquid phase, thereby making it possible to safely separate combustible and/or explosive gaseous mixtures from a variety of aqueous solutions like seawater. Use of ionized and conductive aqueous solutions as carryovers in a primary separation stage substantially eliminates the potential for electrostatic ignition of combustible and/or explosive gaseous mixtures. The conductive properties of aqueous solutions, i.e. seawater, prevent the buildup of electrostatic charges, thereby eliminating a major cause of the propagation of, for example, $H_2/O_2$ combustion and/or explosion. Inlet velocity, operating pressure levels, residence time and physical dimensions of the primary separator are variables that are manipulated to adjust the separation efficiency or the amount of liquid phase carryover and to aid in providing a well-mixed, two-phase stream from the primary separator.

In operation, the aqueous solution is introduced into the primary separator where the gaseous phase component is separated out and mixed with an effective amount of liquid phase. The separated mixture is sequentially directed through a screen atomizer that ensures that a safe, uniformly dispersed gas/liquid mixture is maintained; through a pressure-and-flow control system that reduces the pressure of the mixture to ambient pressure; and finally into a secondary separator where the liquid phase component is separated out in a gravity settling tank and the gaseous phase component is mixed with a diluent gas supplied by an external source. The mixing with a diluent gas provides dilution of the gaseous phase component, assuring that a safe mixture of combustible and/or explosive gases is maintained.

The diluted gaseous phase component and the liquid phase component are then processed through appropriate disposal systems.

DETAILED DESCRIPTION OF THE PREFERRED EMBODIMENTS

Figure 1:
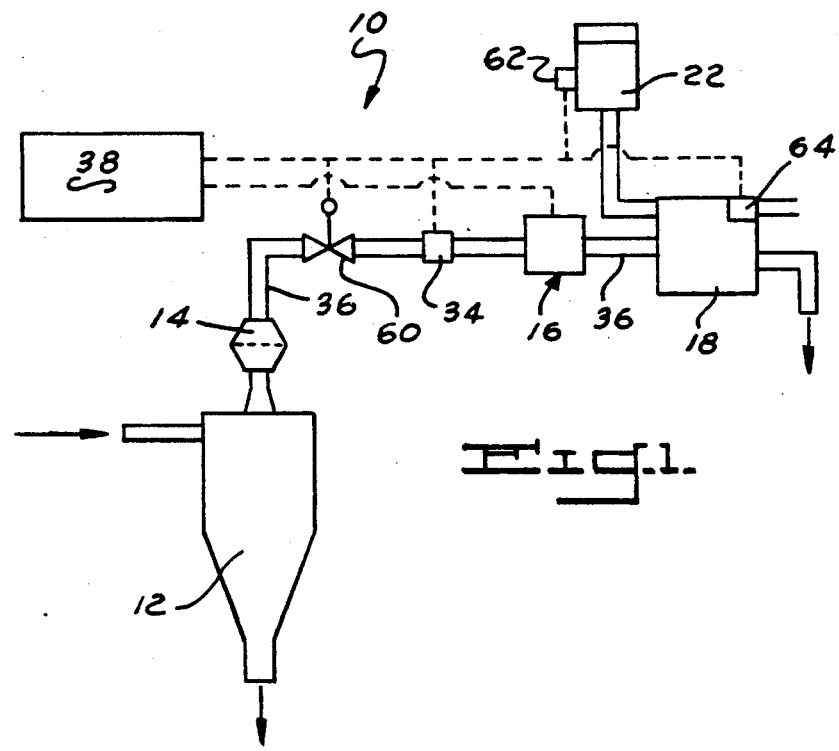
FIG. 1 is a schematic view of the inventive separating unit.

Referring now to the drawings in detail, a multi-stage apparatus for the safe separation of combustible and/or explosive gaseous mixtures from aqueous solutions is shown in FIG. 1 and generally designated by the reference numeral 10. The invention 10 basically comprises a primary separator 12 where ionized and conductive aqueous solutions enter and entrained gases contained therein along with effective amounts of carryover liquid phase (hereinafter referred to as the "gas/entrained liquid mixture") are separated from the solution and mixed; a screen atomizer 14, in fluid connection with the primary separator 12, that produces mechanical subdivisions of the gas/entrained liquid mixture thereby ensuring that a safe, uniformly dispersed mixture of gas and liquid is maintained; a pressure-and-flow control system 16, in fluid connection with the atomizer 14, that reduces the pressure of the gas/entrained liquid mixture to normal, ambient pressure; and a secondary separator 18, in fluid connection with the control system 16, where the entrained liquid component is removed in a settling tank 20 (See FIG. 4) and the gaseous phase component is mixed with a diluent gas, supplied by external source 22, thereby diluting the gaseous phase component and assuring that a safe mixture of combustible and/or explosive gases is maintained.

Figure 2:
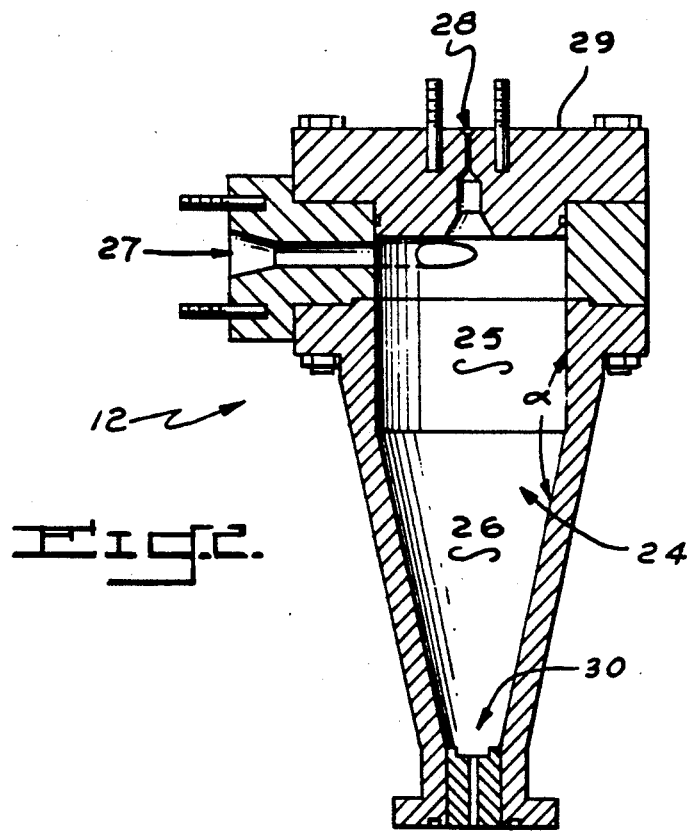
FIG. 2 is a fragmentary cross-sectional view of the primary separator shown in FIG. 1.

The primary separator 12 is best shown in FIG. 2. It includes a chamber 24 comprised of a vertical cylinder 25 and a conical lower portion 26. The chamber 24 has an inlet port 27 in the side of cylinder 25; a gas/entrained liquid mixture outlet port 28 in a top or cover 29; and an aqueous phase discharge port 30 in the base of the conical lower portion 26. Preferably, the primary separator is any suitable centrifugal separator, like a cyclone separator.

The length of the vertical cylinder 25 is from about 15 to about 40 inches and preferably from about 20 to about 30 inches; the cylinder diameter is from about 4 to about 12 inches and preferably from about 6 to about 10 inches; the angle ($\alpha$) formed by the intersection of the vertical cylinder 25 and the conical lower portion 26 is from about 150° to about 170° and preferably from about 155° to about 165°; and the internal volume of chamber 24 is from about 100 to about 1500 cubic inches and preferably from about 300 to about 900 cubic inches.

Cyclone separators, of the type shown in FIG. 2, are well known. The design of chamber 24 is dependent on many factors including but not limited to gas/liquid mixture inlet velocities, densities, viscosities, pressure, etc. Chamber 24 was designed to accommodate an aqueous solution inlet velocity in the range of about 10 to about 60 gallons per minute.

The pressure-and-flow control system 16 of the present invention can be any standard pressure reducing system. Systems which utilize any of a variety of flow restrictors such as orifice plates, flow restricting valves in series, capillary tubing, packed beds, and the like are suitable to reduce the pressure of the gas/entrained liquid mixture to ambient pressure.

Figure 3:
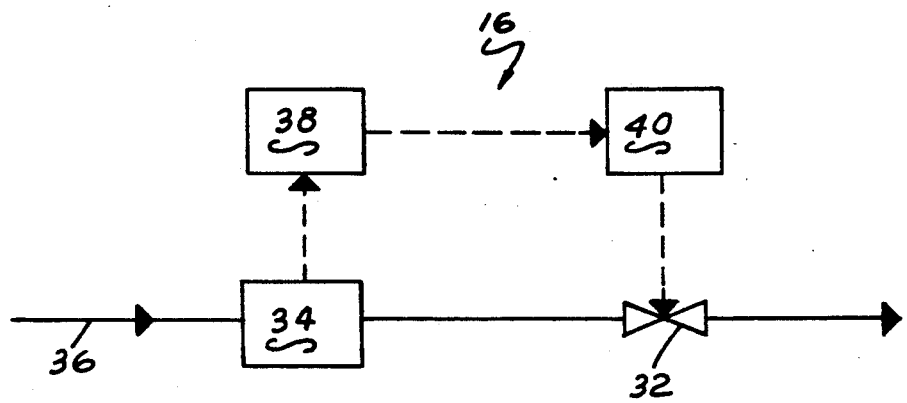
FIG. 3 is a cross-sectional view of the pressure-and-flow control system shown in FIG. 1.

The preferred pressure-and-flow control system 16 is shown in FIG. 3. Its main components are a flow restricting valve 32, such as a characterized seat control valve, Model No. CTP 4466 TMSW C30, available from Worcester Controls of Marlborough, Mass., which serves to reduce the pressure of the gas/entrained liquid mixture. This control system 16 also includes a fluid or flow meter 34, such as Model No. FV-510L manufactured by Omega Engineering Inc. of Stamford, Conn., for measuring the pressure and flow rate of the mixture flowing through pipe 36; and an automatic controller or regulator 38, such as Model No. HQ99 manufactured by Worcester Controls of Marlborough, Mass., that continuously monitors the pressure and flow readings from the fluid or flow meter 34 and serves to regulate the orifice opening of valve 32 by activating a motor drive 40, such as Model No. 75 manufactured by Worcester Controls of Marlborough, Mass. An alternative unit which combines 38, 40 and 32 is sold as a modulating solenoid control unit, Model No. 120, by Target Rock Corp. of Farmingdale, N.Y.

Figure 4:
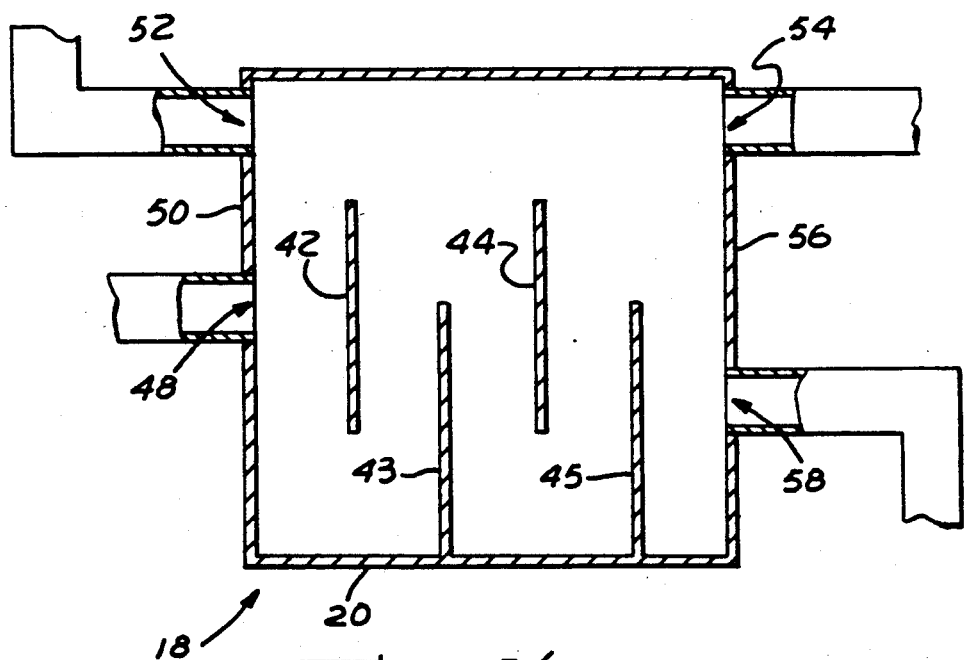
FIG. 4 is a cross-sectional view of the secondary separator shown in FIG. 1.

The secondary separator 18 is best shown in FIG. 4. It includes a series of staggered, vertical baffles 42, 43, 44, 45. The even numbered baffles, such as baffle 42, are positioned above the bottom of the separator and below the top of the separator, while the odd numbered baffles, such as baffle 43, extend upwardly from the bottom. This staggered combination forms a tortuous flow path, enhancing gravity separation. The baffle closest to the liquid phase discharge port 58 acts as a water trap so that there is always liquid isolating the liquid phase discharge port and the gas. The number of baffles that can be employed is not fixed and is dependent on the residence time desired, as well as the extent of resistance to sloshing desired. In addition, the secondary separator 18 includes a gas/entrained liquid mixture inlet port 48 located on a vertical wall 50 of the secondary separator 18; an ambient air inlet port 52 located on the vertical wall 50 of the secondary separator 18; a diluted gaseous phase component discharge port 54 positioned on a vertical wall 56 of the secondary separator 18 is; and a liquid phase discharge port 58 located on the vertical wall 56 of the secondary separator 18.

In operation, the aqueous solution, flowing at a rate of about 10 to about 60 gallons per minute and preferably at a rate of about 20 to about 50 gallons per minute, is introduced through inlet port 27 of the primary separator 12. As the aqueous solution enters the separator, which operates at a pressure level of greater than 20 psi, it is believed to establish an orbital flow following the wall of the separator and to flow toward the apex of the conical lower portion 26 of chamber 24. The spiralling flow creates a centrifugal force that accelerates more dense solids and liquids outward toward the wall of the separator, gases and less dense liquids migrate towards the center of the separator. The average residence time of the mixture in the primary separator 12 is from about 1.5 to about 12 seconds and preferably from about 2 to about 5 seconds. The separated gases, along with a controlled amount of liquid phase, exit the separator through the gas/entrained liquid mixture outlet port 28. The controlled amount of liquid phase is from about 5 to about 30% of the liquid phase present in the cyclone separator at any given time and preferably from about 10 to about 20%.

Inlet velocity, operating pressure levels, residence time, and physical dimensions of the primary separator are all variables that affect separation efficiency and aid in the mixing of the gaseous component and the liquid phase carryover in the primary separation phase.

Upon leaving the primary separator 12 through the gas/entrained liquid mixture outlet port 28, the gas/entrained liquid mixture passes through the screen atomizer 14 that ensures that a safe, uniformly dispersed mixture of gas and liquid is maintained. The gas/entrained liquid mixture is then directed along pipe 36, through an optional shut-off valve 60 and into the pressure-and-flow control system 16 flowing at a rate of from about 0.75 to about 15 gallons per minute (preferably from about 2.2 to about 7.5 gallons per minute). There, controller 38, which has received pressure-and-flow readings from the fluid or flow meter 34 relays a signal to the motor drive 40 which then regulates the opening of the orifice of valve 32. The pressure of the gas/entrained liquid mixture flowing through valve 32 is thereby reduced to near ambient pressures.

Upon leaving the preferred pressure-and-flow control system 16, the gas/entrained liquid mixture is directed along pipe 36 to the secondary separator inlet port 48. The input flow rate of the gas/entrained liquid mixture entering the secondary separator is from about 0.75 to about 15 gallons per minute and preferably from about 2.2 to about 7.5 gallons per minute. Once inside the secondary separator 18 this mixture is directed through a path defined by the series of staggered, vertical baffles 42, 43, 44 and 45, which enhance the gravity separation of the entrained liquid phase component. The gaseous phase component is mixed with a diluent gas supplied by external source 22 through inlet port 52 at a flow rate of from about 7.5 to about 150 gallons per minute and at a preferred flow rate of from about 22 to about 75 gallons per minute. The average residence time of the diluted mixture in the secondary separator is from about 6 to about 120 seconds and preferably from about 18 to about 60 seconds. The separated liquid phase component is directed out discharge port 58 and the diluted gaseous phase component is directed out discharge port 54.

Upon separation of the gas/entrained liquid mixture into its constituent phases, the resulting gas (i.e. hydrogen and oxygen mixture) must be removed from the system. Many techniques, well known in the art, including storage or chemical oxidation may be employed at this point.

To insure the safe operation of the inventive liquid and gas phase separating system, the system may include other automatic and/or manual shut-off valves and in-line devices (e.g. at 62, 64 in FIG. 1) that monitor specified parameters. These parameters include the amount of gas/liquid flow and pressure at various in-line positions, the air pressure entering the secondary separator and the combustibility of the diluted gaseous product stream. If an anomaly is detected by one of the process monitors, shutdown of the system should follow.

It should be understood that obvious structural modifications can be made without departing from the spirit of the invention. For example, the inventive system may be modified to accommodate inlet flow rates ranging from fractions of a gallon per minute to hundreds of gallons per minute. Accordingly, reference should be made primarily to the accompanying claims rather than the foregoing specification to determine the scope of the invention.

Having thus described the invention what is claimed is:

1. A multi-step method for safe separation of combustible and/or explosive gaseous mixtures from aqueous solution which comprises:
    a. separating entrained gases contained therein along with an effective amount of liquid phase;
    b. mixing the separated gas/entrained liquid mixture;
    c. reducing the pressure of the gas/entrained liquid mixture to ambient pressure;
    d. separating the entrained liquid phase component from the gaseous phase component; and
    e. diluting the gaseous phase component with a diluent gas.

2. The multi-step method of claim 1 wherein the effective amount of liquid phase of separating step (a) is from about 5 to about 30%.

3. A multi-step method for safe separation of combustible and/or explosive gaseous mixtures from aqueous solution which comprises:
    a. separating entrained gases contained therein along with an effective amount of liquid phase;
    b. mixing the separated gas/entrained liquid mixture;
    c. atomizing the gas/entrained liquid mixture;
    d. reducing the pressure of the gas/entrained liquid mixture to ambient pressure;
    e. separating the entrained liquid phase component from the gaseous phase component; and
    f. diluting the gaseous phase component with a diluent gas.

4. The multi-step method of claim 3 wherein the effective amount of liquid phase of separating step (a) is from about 5 to about 30%.

5. A multi-stage apparatus for safe separation of combustible and/or explosive gaseous mixtures from aqueous solution comprising a primary separator; where entrained gases along with effective amounts of carry-over liquid phase are separated from the solution and mixed; a screen atomizer, in fluid connection with the primary separator, that produces mechanical subdivisions of the gas/entrained liquid mixture thereby ensuring that a safe, uniformly dispersed mixture of gas and liquid is maintained; a pressure-and-flow control system, in fluid connection with the atomizer, that reduces the pressure of the gas/entrained liquid mixture to normal, ambient pressure; and a secondary separator, in fluid connection with the pressure-and-flow control system, where the entrained liquid phase component is removed in a settling tank and the gaseous phase component is mixed with a diluent gas thereby diluting the gaseous phase component and assuring that a safe mixture of combustible and/or explosive gases is maintained.

6. The multi-stage apparatus of claim 5 wherein the primary separator is a centrifugal separator.

7. The multi-stage apparatus of claim 6 wherein the centrifugal separator is a cyclone separator.

8. The multi-stage apparatus of claim 7 wherein the cyclone separator is comprised of a chamber comprised of a cylindrical section and a conical section and having a cylinder length of about 15 to about 40 inches; a cylinder diameter of about 4 to about 12 inches; an angle, formed by the cylindrical and conical sections, of about 150° to about 170°; and a chamber volume of about 100 to about 1500 cubic inches.

9. The multi-stage apparatus of claim 5 wherein the pressure-and-flow control system is comprised of a flow restricting valve that retards the flow thereby reducing the pressure of the gas/entrained liquid mixture; a fluid or flow meter upstream, that measures the pressure and flow rate of the approaching mixture; an automatic controller or regulator, connected to the fluid or flow meter and to a valve operating mechanism that continuously monitors the pressure and flow readings from the fluid or flow meter and then adjusts the orifice opening of the flow restricting valve by activating a valve operating mechanism; and a valve operating mechanism such as a motor drive, connected to the controller and to the flow restricting valve that mechanically adjusts the orifice opening of the flow restricting valve upon receiving a signal from the controller.

* * * * *